Patented Jan. 15, 1935

1,988,126

UNITED STATES PATENT OFFICE 1,988,126

WATERPROOF SHEET AND PROCESS OF MAKING SAME

Lester Kirschbraun, New York, N. Y., assignor to The Patent and Licensing Corporation, New York, N. Y., a corporation of Massachusetts No Drawing. Original application August 16, 1920, Serial No. 404,014. Divided and this application April 23, 1934, Serial No. 722,017

15 Claims. (Cl. 134—17)

This invention relates to improvements in waterproof sheets and process of making same and refers more particularly to waterproof sheets preferably felted, made from cotton stalks, or analogous paper making fibers, saturated or impregnated with a waterproofing agent.

This application is a division of my copending application Serial No. 144,178, filed October 25, 1926, which latter application is in turn a division of my application Serial No. 404,014, filed August 16, 1920.

Among the objects of the invention are to provide a waterproof sheet consisting of felted cotton stalks, or analogous paper making fibers, which simultaneously with the felting operation are impregnated or saturated with a waterproofing agent, as for example, rubber or asphalt, or combinations thereof.

The invention may be carried out as follows: I preferably take rubber and flux it with a bituminous material, such as asphalt or coal tar pitch, on calendar rolls, in the usual way. I then gradually add this rubber compound while it is in a more or less heated plastic condition to a relatively stiff paste of colloidal clay and water, the latter being in a heated condition, as for example, 180° F. The rubber compound is added to the paste in the well known types of kneading and masticating machines, so as to permit the rubber compound to become gradually dispersed in very small particles in the aqueous paste. This mixture is then thinned with the water and forms a nonadhesive emulsified matrix in which the rubber compound is dispersed through the water.

This emulsion is then mixed with pulp stock formed from cotton stalks, or analogous paper making fibers, and the mixture sufficiently thinned with water to permit of it readily flowing over a paper machine where the fibrous constituents thereof are felted. As the water is removed, the dispersed particles of the binder coalesce and unite to form a continuous film throughout the felted sheet of fibrous stock.

If it is desired to vulcanize the sheet thus formed, a vulcanizing agent, as sulphur, may be incorporated with the emulsion, and the sheet is vulcanized as it passes over the drying rolls of the paper machine or over hot calendar rolls.

The sheets thus formed may be used as rubber blankets, for waterproof packages, for rubber gaskets, shoe elements, and in fact for a wide variety of usage.

It may be desirable, instead of using fibrous stock entirely, to mix it with a certain percentage of asbestos fiber in order to get a more heat resisting stock, as for example, gaskets subjected to a high temperature.

Having thus described my invention, what I claim is:—

1. A process for making an emulsion consisting in fluxing rubber with a bitumen, and in then dispersing the fluxed material in an aqueous vehicle by means of a colloid.

2. A process of producing a rubber asphalt emulsion consisting in softening rubber with an asphalt by plasticization and in dispersing the softened rubber and asphalt in an aqueous vehicle and a colloid by mastication.

3. A process of producing a rubber asphalt emulsion consisting in softening rubber with an asphalt and in dispersing the softened rubber and asphalt in an aqueous vehicle and a colloid.

4. A process of making an emulsion consisting in softening rubber with a bitumen and in dispersing said softened rubber-bitumen blend in water by means of a colloid.

5. A process of making an emulsion consisting in softening rubber with a bitumen and in dispersing said softened rubber-bitumen blend in water by means of a colloid by masticating the blend in the presence of the water and the colloid.

6. As a new composition of matter, a mixture of a rubber and bitumen and a colloid produced by mastication of the rubber and bitumen in the presence of the colloid and an aqueous medium, the rubber and bitumen being dispersed in the colloid.

7. A composition of matter comprising a mixture of rubber, asphalt and a colloid, produced by masticating or kneading the rubber, asphalt an aqueous medium and a colloid while in a plastic form, the rubber and asphalt being dispersed in the colloid.

8. A process for producing a dispersion consisting in first plasticizing rubber and a bituminous fluxing agent, in forming a paste of a liquid and a colloid, and in then dispersing the plasticized rubber and bituminous fluxing agent in said paste by mastication to produce a dispersion capable of being thinned with water.

9. A process for making a dispersion consisting in first plasticizing a rubber-asphalt mixture and in dispersing said plasticized rubber-asphalt blend in an aqueous vehicle and a colloid by mastication.

10. The method of dispersing a rubber-bitumen blend in a colloid comprising mixing the colloid with an aqueous medium and in dispersing the rubber-asphalt blend therein by mastication to produce a dispersion of the rubber and asphalt capable of being thinned with water.

11. The method of dispersing a rubber-bitumen blend comprising forming a paste of a colloid and a water, and in dispersing said rubber-bitumen blend in said paste.

12. The method of dispersing a rubber-bitumen blend comprising forming a paste of a colloid and an aqueous medium, and in dispersing said rubber-bitumen blend in said paste by mastication.

13. A method of dispersing a rubber-asphalt blend into a colloid comprising forming a thick paste of a colloid with water and in dispersing the rubber-asphalt blend into said paste by mastication.

14. As a new composition of matter, a dispersion consisting of dispersed particles of rubber and asphalt and a colloid, the rubber and asphalt being in the dispersed phase.

15. A composition of matter comprising an emulsion of rubber and bitumen in an aqueous medium containing a colloid.

LESTER KIRSCHBRAUN.